Sept. 9, 1958　　　K. J. HARRIS　　　2,851,117
DUAL RATIO DRIVE MECHANISM FOR TRACTORS EQUIPPED
WITH TRANSVERSELY DISPOSED ENGINES
Filed Dec. 23, 1954　　　　　　　　　2 Sheets—Sheet 1

INVENTOR.
K. J. HARRIS

Sept. 9, 1958     K. J. HARRIS     2,851,117
DUAL RATIO DRIVE MECHANISM FOR TRACTORS EQUIPPED
WITH TRANSVERSELY DISPOSED ENGINES
Filed Dec. 23, 1954     2 Sheets-Sheet 2

INVENTOR.
K. J. HARRIS

United States Patent Office 2,851,117
Patented Sept. 9, 1958

2,851,117

DUAL RATIO DRIVE MECHANISM FOR TRACTORS EQUIPPED WITH TRANSVERSELY DISPOSED ENGINES

Kenneth J. Harris, Waterloo, Iowa, assignor to Deere Manufacturing Co., Dubuque, Iowa, a corporation of Iowa Application December 23, 1954, Serial No. 477,243

9 Claims. (Cl. 180—53)

This invention relates to driving mechanism for a vehicle and more particularly to dual-range or dual-ratio drive means for an agricultural tractor. Still more particularly, the invention pertains to dual-ratio mechanism that includes planetary gear drive means.

The conventional agricultural tractor, like most vehicles of the automotive type, is equipped with a power train including a power source, a selective or change-speed transmission and final drive means for the traction wheels. The transmissions in some tractors are provided with a relatively high number of speed ratios, giving the tractor a correspondingly large number of forward speeds; and, in some instances, the transmissions provide a plurality of speeds in reverse. It will be appreciated that the greater range or flexibility of a tractor transmission presents problems not encountered in the usual automotive truck or passenger car, because of the wide variety of tasks that the tractor is called upon to perform. For example, in plowing, variations in soil texture or other resistances may suddenly occur that normally require a down shift in order to enable the tractor to lug through the particular obstacle. In the conventional transmission, although the down shift is possible, it can be accomplished only at the expense of materially reducing or even stopping forward travel of the tractor while the shift is made.

The need for a higher than usual number of speeds in a transmission has heretofore been met in any one of several ways. In the simplest but not necessarily the best solution, the transmission is designed with a relatively high number of gears, which may be shifted singly or in sets to produce any one of several speeds. In other instances, the transmission may be of the type having a multi-speed countershaft, affording two or more ranges, each of which produces a limited number of speeds but which, in multiplication, produces a number of ratios equal to speed changes times ratio changes.

The present invention deals with a solution of the latter character; that is, it is concerned with a dual-ratio transmission in which the transmission basically has a limited number of speeds but this number is doubled by the provision of a dual-ratio driving element. In order that the down shift or up shift may be made as conveniently and as quickly as possible, planetary gear clutches are used in place of sliding gears. This idea is not broadly novel but the particular type of planetary gear mechanism disclosed herein is deemed to be novel. In its broader aspects and without regard to the specific character of the planetary gear mechanism, the invention features the provision of a dual-ratio mechanism in a tractor of the type in which the engine crankshaft is transverse to rather than parallel with the fore-and-aft extent of the tractor. A typical tractor of the character just referred to is shown in the U. S. patent to McCray 1,957,221. In such a tractor, the left-hand end of the crankshaft carries the flywheel and the right-hand end carries a belt pulley. Because of the requirement that the agricultural tractor carry or mount certain types of row-crop implements, such as corn pickers, cultivators, etc., it is desired that the body be as narrow as possible, due regard being had to the transverse overhang of the belt pulley. However, the body may be widened somewhat at its rear end because that end is out of the line of vision of the operator as respects crops located forwardly relative to the tractor as the tractor advances. Accordingly, it is an object of the invention to provide the dual-ratio means in a compartment externally of the body, whereby the compartment may be added to the body as an attachment and in any event may be located somewhat rearwardly so as not to materially increase the width of the body in a critical zone. In this respect, the invention features the substitution of the dual-ratio mechanism in the location conventionally occupied by the belt pulley and, as a further feature, adds the belt pulley ahead of the original location. The invention in this aspect provides a dual-ratio drive for the belt pulley and the belt pulley therefore constitutes a power take-off operative selectively at either of two speeds.

The invention features further the provision of improved control means for the planetary dual-ratio drive means. Another feature, in connection with the control means, is the selective utilization of a single control lever for controlling either of two planetary mechanisms or a transmission brake mechanism. In its overall aspect, the design affords a novel and compact arrangement of parts having, in addition to the features and objects outlined above, other features and characteristics that will appear as a preferred embodiment of the invention is disclosed in detail in the following specification and accompanying sheets of drawings, the several figures of which are described immediately below.

Figure 1:
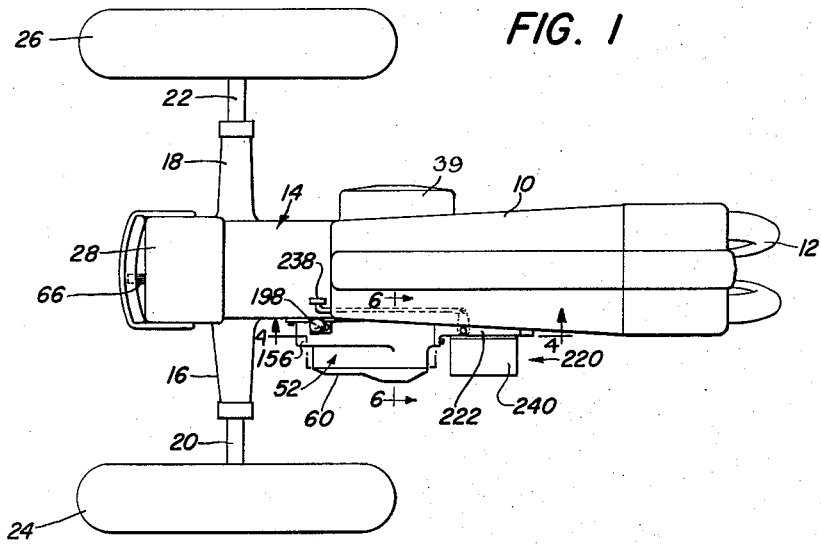
Fig. 1 is a plan view of a typical agricultural tractor, herein shown as equipped with the driving mechanism of the invention.

The tractor chosen for the purposes of illustration is generally of the type disclosed in the above-mentioned McCray patent and as such comprises a longitudinal body 10 carried on its front end on a steerable wheeled truck 12 and having a rear body portion 14 serving as a transmission and final drive housing from opposite sides of which respectively extend right- and left-hand axle housings 16 and 18. These housings respectively journal axles 20 and 22 on which are respectively keyed right- and left-hand traction wheels 24 and 26. An operator's seat 28 is located above the transmission and final drive housing 14.

Figure 2:
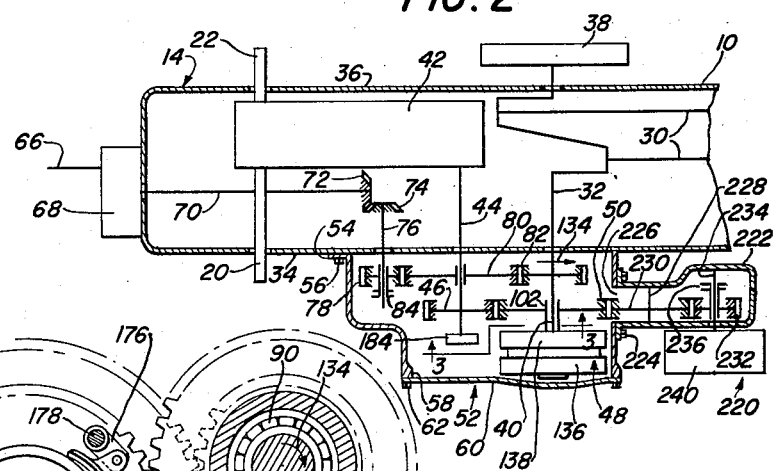
Fig. 2 is a schematic plan view, partly in section, showing generally the arrangement of the components in the power train.

The tractor is powered by a power train that includes an internal combustion engine, not shown as such but represented by a pair of connecting rods 30 connected to a crankshaft 32 having its length transverse to the fore-and-aft extent of the body 10. The transmission and final drive housing 14 has a vertical right-hand wall 34 and a corresponding upright left-hand wall 36. As will be seen in Fig. 2, the crankshaft 32 has fixed to its left-hand end and externally of the wall 36 a flywheel 38. That flywheel is, in Fig. 1, shown as being enclosed in a flywheel housing 39. The right-hand end of the crankshaft includes an integral coaxial extension which is hereinafter variously referred to as an engine or power shaft or driving member 40.

The body or housing portion 14 affords a compartment, which is not unusual for a housing, and within this compartment is transmission and final drive mechanism, represented here by the schematic rectangle and designated generally by the numeral 42, which designation is deemed sufficient for the present purposes, since the details are of no particular significance. It will be recognized that the mechanism 42 may contain a typical selective speed transmission and a differential driven thereby and in turn driving the traction wheel axles 20 and 22. The power input for the transmission takes the form of an input or driven shaft 44. This shaft (Fig. 2) is behind and parallel to the crankshaft 32 and its right-hand end projects through the right-hand housing wall 34 to have keyed thereto a driven or input gear or member 46. This gear as will be brought out in detail below is driven by the power shaft 40 at either of two speeds by dual-ratio means 48 which includes, in addition to other components that will presently appear, an output or transmission driving gear or member 50. This gear is in constant mesh with the transmission input gear 46 but is journaled on the outer end 40 of the crankshaft 32. As will be brought out, the dual-ratio means 48 includes clutch means by which the gear 50 may be connected to or disconnected from the engine output shaft 40, which is mentioned merely to establish the fact that the gear 50 is not constantly driven by the engine or power shaft 40. The dual-ratio means 48 and various components associated therewith are all enclosed in a unit housing designated generally by the numeral 52. This housing is mounted externally of and on the right-hand side wall 34 of the body 10—14, having an appropriate mounting flange 54, secured to the wall 34 as by cap screws 56, and a right-hand side opening 58, normally closed by a cover 60 removably mounted over the opening as by cap screws 62. Tapped bores are visible at 64 in Fig. 4 for receiving the cap screws 62.

In a tractor of the type conventionally designed according to the McCray patent noted above, the outer end of the crankshaft 32—here the power output shaft 40—is equipped with a combination clutch and belt pulley as shown in the U. S. patent to McCormick 2,103,543, and this clutch is selectively engageable and disengageable to establish and disestablish drive to and from a transmission input shaft such as the shaft 44 here. The selective speed changes in the transmission are available to afford several forward speeds for the tractor. A basic difference between that design and the instant design is that here the clutch and belt pulley arrangement is replaced by the dual-range means 48 and the speeds available in the transmission 42 are doubled, because the means 48 provides for driving of the shaft 44 selectively at either of two speeds. At the same time, other desirable characteristics of the basic tractor construction are retained and are even improved.

For example, the tractor is shown as being conventionally equipped with a rearwardly extending power take-off shaft 66 which derives its power in the first instance from the engine crankshaft 32. As shown in the U. S. patent to Fletcher 2,676,686, the power take-off shaft, such as that shown at 66 here, is driven through gear reduction means, represented here by the numeral 68, powered by means of a power take-off input shaft 70. This shaft is driven independently of the transmission and is therefore of the type correctly or otherwise known as a continuously running power shaft. The drive in the present instance comprises a pair of meshing bevel gears 72 and 74, respectively on the shaft 70 and on a transverse shaft 76. The shaft 76 projects rightwardly through the wall 34 of the housing 14 and has slidably splined thereon a pinion 78 adapted for meshing and demeshing relative to a large gear 80 journaled on the transmission input shaft 44 within the unit housing 52 and in constant mesh with a power take-off drive gear 82 that is keyed to the power output or engine shaft 40. The power take-off pinion 78 has a shift collar 84 by means of which it may be selectively shifted into and out of engagement with the large gear 80. When engagement between the pinion 78 and gear 80 is established, the power take-off 66 is driven as long as the engine crankshaft 32 is rotating. Shifting of the power take-off pinion may be accomplished by any suitable means, which is without significance here.

Figure 6:
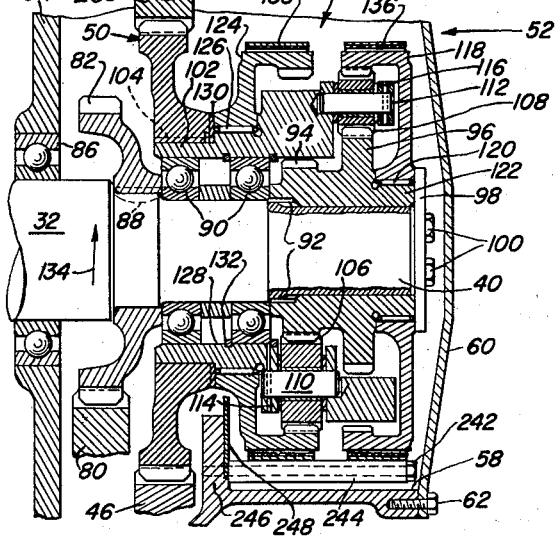
Fig. 6 is a vertical sectional view, as seen along the line 6—6 of Fig. 1, the view being drawn to a scale enlarged over that of Fig. 1.

As best seen in Fig. 6, the crankshaft 32 has its right-hand end portion 40 journaled in a suitable bearing 86 in the right-hand wall of the body housing 14. Next adjacent to the bearing 86 is the power take-off drive gear 82, a keyed connection between the gear and the output shaft 40 being established at 88. Just to the right of the gear 82 is a pair of bearings 90 and beyond these bearings the end of the shaft has a pair of diametrically opposed keyways 92, by means of which there is keyed to the shaft 40 for rotation therewith a double sun gear cluster comprising a low-speed sun gear 94 and a high-speed sun gear 96. The sun gear cluster 94—96 is retained on the shaft 40 by an end cap 98 and a pair of cap screws 100.

The bearings 90 serve to journal on the shaft 40 a planet gear carrier 102, to which the driving gear 50 is keyed, as at 104 (Fig. 6). The planet carrier carries a set of low-speed planet gears 106 and a set of high-speed planet gears 108, which planet gears mesh respectively with the low-speed and high-speed sun gears 94 and 96. The planet carrier 102 may be provided in any suitable manner with one set of journals or planet mounting portions 110 for the planets 106 and a separate set of journals or planet mounting portions 112 for the planets 108. Retention of the planets on their respective journals is accomplished respectively by pins 114 and 116.

A high speed ring gear or drum 118 is journaled, as by needle bearings 120, on a hub 122 of the sun gear cluster 94—96; and a low-speed ring gear or drum 124 is journaled, as by needle bearings 126, on an annular intermediate portion or hub 128 of the planet carrier 102. A suitable thrust bearing 130 is interposed between the low-speed ring gear 124 and the driving gear 50 since, as will be recalled, the gear 50 is keyed to the carrier 102 whereas the drum 124 is journaled on the carrier. Endwise shifting of the carrier 102 is prevented by means of a pair of snap rings 132 that engage opposite sides of the right-hand bearing of the two bearings 90.

From the description thus far, it will be seen that the engine or power shaft 40 and the sun gears 94 and 96 keyed thereto rotate in the direction of the arrow 134, which means that the planet pinions 106 and 108 will rotate in the opposite direction. When the tractor is standing still and the shaft 40 is rotating, the load of the tractor, transmitted to the planet carrier 102 by the transmission, the shaft 44 and the gears 46 and 50, in effect holds the carrier 102 stationary and if there is nothing to retard the ring gears 118 and 120, they will rotate in unison, but at different speeds of course, in a direction opposite to the direction indicated by the arrow 134. If the ring gears or drums 118 and 124 are selectively controlled—for example, alternately held and released—the gear 50 will be driven at either one of two speeds, giving the means 48 its dual-ratio characteristic. Control for the drums 118 and 124 is here accomplished by a pair of selective brake means, comprising a high-speed brake band 136, a low-speed brake band 138 and control components associated respectively therewith.

The band 136 is typically wrapped around the drum 118 and has first and second or upper and lower opposite ends 140 and 142, respectively, very closely spaced apart at the rear of the drum. The lower member is in the form of a downwardly facing hook engaged by a compression member 144, the lower end of which is received by a vertically adjustable anchor 146. The upper end 140 is in the form of an upwardly facing hook which receives the lower end of an upper compression member 148. The upper end of the member 148 is forcibly engaged by the downwardly facing hooked end of a bell crank 150 that is rockable on a transverse rockshaft 152.

The rockshaft 152 is journaled at one end in a wall 154 formed as an integral part of an upper housing portion 156 of the unit housing 52. The housing portion 156 serves as a support for other components of the control means, to be presently described. The outer end of the rockshaft 152 is journaled in a suitable bearing (not shown) formed as an integral part of the cover 60, previously described. These details are not material to an understanding of the control means and have therefore been omitted.

The rockshaft carries a second bell crank 158 which operates on an upper compression member 160 similar to the compression member 148 but associated with the low-speed band 138. In this respect, it will be understood that the details of the bands are identical and what has been said about the band 136 and its associated control components applies also to the band 138, even though the latter details are not fully illustrated in the drawings. However, the presence of the identical parts for the band 138 will be apparent in part from what is shown in Fig. 5.

The support 156 afforded by the unit housing 52 carries a second rockshaft 162, the mounting of the rockshaft being in part in the wall 154 and in part in the cover (not shown). This rockshaft carries a high-speed brake operator 164, a low-speed brake operator 166 and a transmission brake operator 168. The operators are arranged with the transmission brake operator 168 between the operators 164 and 166, the three being individually and freely journaled on the rockshaft 162 for independent rocking movement. The brake operators 164 and 166 are respectively connected to the brake-actuating bell cranks 150 and 158 by links 170 and 172, so that rocking of the high-speed brake operator 164 functions through the link 170 to rock the bell crank 150 for the high-speed band 136 and rocking of the low-speed operator 166 functions through the link 172 to rock the bell crank 158 for the low-speed band 138.

The transmission brake operator 168 is connected by a pair of links 174 to a bell crank 176 which includes a rockshaft 178 journaled in a suitable bearing 180 in the upper housing portion 156 of the unit housing 52. The bell crank 176 carries a brake shoe 182 selectively effective to establish a braking relationship with a brake drum 184 that is keyed to the transmission input shaft 44. The brake shoe is normally disengaged from the brake drum 184 by means of a tension spring 186. The high-speed brake band 136 is normally held in a released or relaxed position by a tension spring 188. A similar spring (not shown) compels the existence of the same situation for the low-speed band 138.

Figure 4:
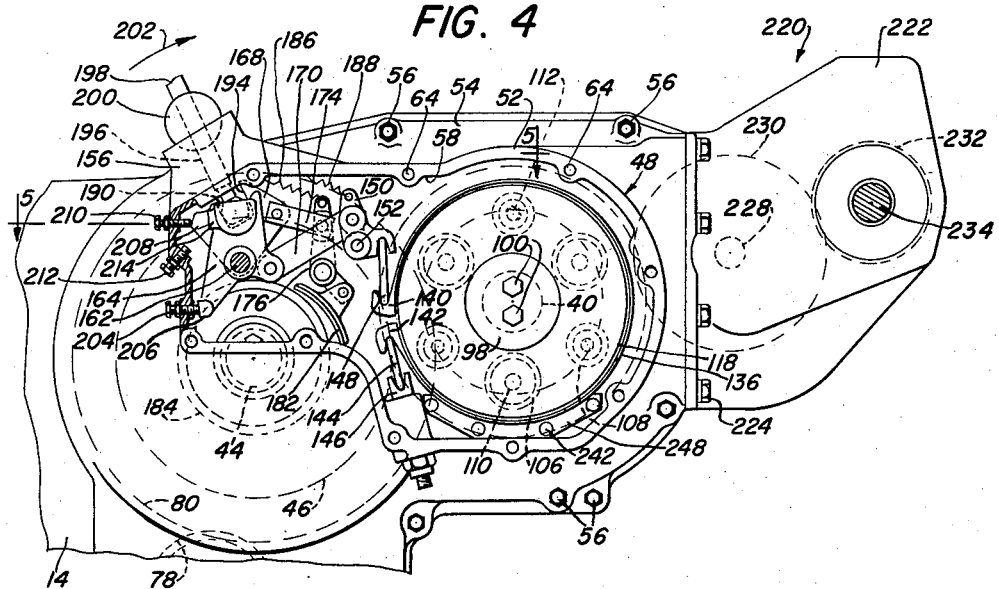
Fig. 4 is an enlarged longitudinal section as seen along the line 4—4 of Fig. 1.
Figure 5:
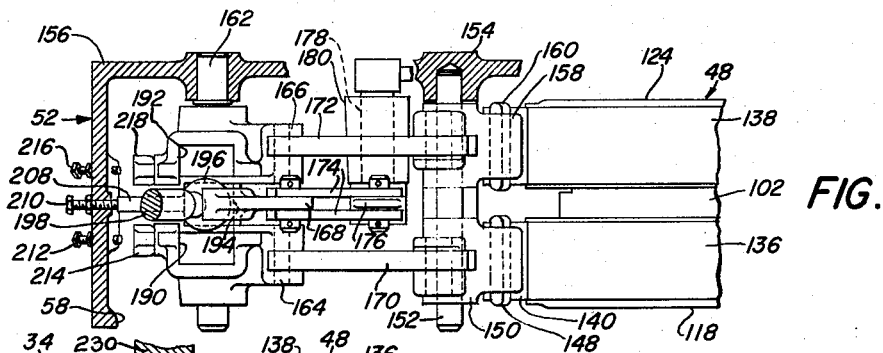
Fig. 5 is a horizontal sectional view on an enlarged scale, as seen along the line 5—5 of Fig. 4.

When all of the brakes are relaxed or released or in their neutral positions, the operators 164, 166 and 168 occupy the positions shown in Figs. 4 and 5, wherein it will be seen that these operators respectively have central lever-receiving notches 190, 192 and 194, transversely aligned in what may be termed a central or neutral zone freely transversely through which may move the lower end 196 of a single control lever 198. This lever is ball-mounted at 200 on the support afforded by the upper housing portion 156 of the unit housing and thereby has movement transversely as well as fore-and-aft. The arrangement is such that the lower end of the lever may be moved transversely about the pivot afforded by the ball so as to select one, and only one, of the three operators 164, 166 and 168. After an operator is selected, the lever may be moved fore or aft, as the case may be, to move the selected operator to cause actuation of the associated brake.

The impossibility of moving more than one operator at one time is established by the relative directions of movements of the operators in applying their respective brakes. The control lever 198 is shown in its neutral position in Figs. 4 and 5, from which position it is moved first laterally and then forwardly or in the direction of the arrow 202 to select one output ratio of the dual-ratio drive unit 48. The lever is moved in the opposite direction to apply the transmission brake 182. The operators are individually stopped against contrary movement. That is to say, an adjustable stop screw 204 engages the lower end portion 206 of the operator 164 so that the operator can be rocked in only one direction away from its neutral position as shown in Fig. 4. A similar screw (not shown) likewise fixes the one-way-movement characteristic of the operator 166 as respects its movement away from its neutral position, it being understood that the positions of the operators 164 and 166 are mutually coincident. To explain: Assume that the tractor driver has moved the control lever 198 so as to select the operator 164. He then pushes forwardly or in the direction of the arrow 202 on the upper end portion of the lever 198, causing the lower end 196 to move rearwardly or in a clockwise direction about the transverse pivot established by the ball mounting 200. This movement in turn is followed by counterclockwise rocking of the operator 164 about the rockshaft 162, driving the link 170 forwardly and rocking the brake bell crank 150 in a clockwise direction about its rockshaft 152. Since the lower end of the band 136 is anchored at 144—146, clockwise rocking of the bell crank 150 applies a downward force through the member 148 to the upper end 140 of the band, resulting in tightening of the band on the drum 118 and thereby locking the ring gear or drum 118 against rotation. An overcenter lock or toggle action is effected by the operator 164, link 170 and bell crank 150 to hold the linkage against release or return to neutral. It will be seen that with the lower end of the lever engaged with the operator 164, rocking of the lever in a direction opposite to that indicated by the arrow 202 and away from the neutral position shown in Fig. 4 will be of no avail, since the operator 164 cannot swing in a clockwise direction about the rockshaft 162 because of the abutting relationship established at 204—206. The same applies to the control of the low-speed operator 166.

As to the transmission brake operator 168, it is free to rock in a clockwise direction about the rock shaft 162, from the position shown in Fig. 4, which movement will transmit force through the links 174 to the brake bell crank 176 to apply the brake 182 against the brake drum 184. This movement is effected by placing the lower end 196 of the control lever 198 in its central position so that it engages the notch 194 of only the operator 168, following which the lever is moved in a direction opposite to that indicated by the arrow 202. Movement of the operator in the opposite direction from the neutral position is prevented by engagement between a rear portion 208 of the lever and a stop screw 210. Return of the lever 198 to its neutral position is influenced by the action of the return spring 186, previously described.

A rearward limit on counterclockwise rocking of the high-speed brake operator 164 is established by engagement between an adjustable stop screw 212 and an integral stop portion 214 on the operator. A similar stop is established at 216 and 218 for the low-speed operator 166.

Another feature of the invention is the provision of a two-speed power take-off, here in the form of a belt pulley attachment designated in its entirety by the numeral 220. This attachment comprises an auxiliary housing 222 removably secured, as by cap screws 224, over a forwardly facing opening 226 in a front portion of the unit housing 52. The auxiliary housing 222 carries an idler shaft 228 on which is an intermediate gear 230 in constant mesh with the power gear 50 and in selective mesh with an output pinion 232 splined to a belt pulley shaft 234. The pinion 232 is axially shiftable into and out of mesh with the idler or intermediate gear 230 by means of a clutch collar 236 under control of external linkage as designated generally at 238 in Fig. 1. The right-hand end of the belt pulley shaft 234 projects rightwardly beyond the auxiliary housing 222 and has fast thereon a belt pulley 240.

Quite obviously, if the unit is desired for use without the belt pulley attachment, the attachment can be removed and the opening 226 can be covered in any suitable manner. Since the belt pulley is geared to the power gear 50 and since this gear has two speeds according to the selected ratio of the dual-ratio means 48, the power take-off afforded by the belt-pulley 240 likewise has two speeds. The location of the belt pulley attachment is fairly desirable, since it is only slightly forwardly of the typical location, which permits the usual location to be utilized to accommodate the dual-ratio unit, and, as already described, it may likewise be in the form of an attachment; although, it could as well be built-in in the factory.

The band 136 relatively freely encircles the drum 118 when it is relaxed; that is to say, it is supported by its ends 140 and 142. However, if these were the only supporting portions, the weight of the band would cause it to drag on the upper surface of the drum 118 and undue wear would occur. In order that this wear may be avoided, the lower portion of the band is supported by a plurality of band rests, each of which comprises an elongated bolt 242 with an enlarged cylindrical portion 244 and threaded into an interior wall portion 246 of the unit housing 52. The same applies to the band 138. As shown in Fig. 6, both bands are adapted to rest at their lower portions on the plurality of supports or rests afforded by the means 242. In the present instance, an oil baffle plate 248 is interposed between the inner ends of the rest screws 242 and the wall 246, this baffle serving to maintain the level of oil in the compartment afforded by the unit housing 52 in the zone of the means 48 without requiring the addition of excess lubricant.

Figure 3:
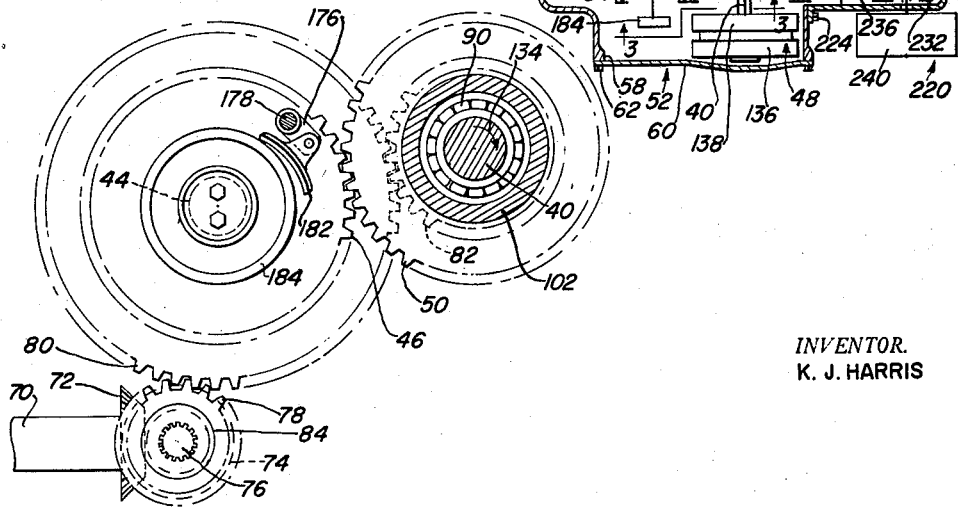
Fig. 3 is an enlarged view, partly in section, as seen along the line 3—3 of Fig. 2.

In operation, the tractor will be idle as long as the main control lever 198 is in its central position as shown in Figs. 4 and 5. Assuming now that the engine has been started, the crankshaft 32 will rotate in the direction of the arrow 134. For reasons previously described, the load on the tractor will hold the planet carrier 102 stationary and the brake-released ring gears or drums 118 and 124 will rotate idly in a counterclockwise direction as viewed in Figs. 3 and 4. Any selected speed in the transmission 42 may be engaged but, without engagement of one or the other of the brake means 136 or 138, the tractor will not move.

Let it further be assumed that the driver selects some intermediate gear in the transmission 42 and, on the basis of the particular load to which the tractor is to be subjected, operates the control lever 198 so as to apply the high-speed brake band 136. This action locks the high-speed ring gear or drum 118 against rotation and since the planet pinions 108 are driven by the high-speed sun gear 96, this force must necessarily be transmitted to the carrier, which was previously held stationary because of the load applied thereto via the transmission 42, transmission shaft 44 and gears 46 and 50. The speed ratio delivered by the means 48 will be determined by the relative number of teeth between the sun gear 96, the planet pinions 108 and the internal teeth on the ring gear or drum 118. In the preferred embodiment of the invention, the sun gear has forty-eight teeth, the planet gear 108 has twelve teeth and the ring gear has seventy-two teeth.

When the tractor is driven forwardly on the basis of the combination speed ratio selected—the high-speed ratio from the means 48 and whatever speed is selected in the transmission 42—it is expected that normal forward travel will be obtained without difficulty. However, should the load suddenly increase or other conditions arise which require the transmission of more power, the driver has only to actuate the control lever 198 so as to release the brake 136 and apply the brake 138, which he may do readily without disturbing in any way at all the gear speed selected in the transmission 42. The transition will be obtained smoothly and without noticeable loss of forward progress and the increase in power will, it is expected, carry the tractor through the temporary condition. The lower speed ratio now transmitted by the means 48 depends, of course, on the ratio between the low-speed sun gear 94, the low-speed planets 106, and the low-speed internal ring gear or drum 124. In the design illustrated, the low-speed sun gear has thirty-six teeth, the low-speed planet pinions have eighteen teeth and the ring gear 124 has seventy-two teeth. Thus, the low-speed ratio is 3 to 1 and the high speed ratio is 2.5 to 1, affording a "down shift" of roughly sixteen and seven tenths percent. These figures are used on the basis of a particular transmission having certain speed ratios built into the transmission 42 and the down shift of the dual-ratio means is designed so that there will be no overlapping among the several speeds in the transmission 42. For example, if first speed in the transmission 42 produces a ground speed of, say, 1.5 M. P. H., and second speed established by the transmission 42 affords a ground speed of, say 2.12 M. P. H., it would be desirable to design the down shift in the means 48 so as to afford a shift from high-speed second speed to low-speed second speed so as to give a ground speed somewhere in between 1.5 and 2.12 M. P. H. these figures are, of course, only representative and the design may be modified according to power characteristics of the particular tractor or load expectancies to be encountered.

In any event, the smooth transition in down shifting and up shifting, naturally afforded by a planetary gear means, is preferable to changing gears in the transmission 42, even if that transmisison were provided with a suitably increased number of speeds. As already pointed out, the broad idea of speed changes by planetary gearing is not new, nor is the utilization of dual-ratio transmissions in agricultural tractors. However, the specific type of planetary gear arrangement is deemed to be novel and, in any event, the dual-ratio arrangement in a tractor of the specific type disclosed is also deemed to be novel. The novel control means adequately adapts itself to control of the mechanism. The two-speed belt pulley attachment is an added feature.

Various other objects and features of the invention not categorically enumerated herein will undoubtedly occur to those versed in the art, as will modifications and alterations in the preferred embodiment of the invention disclosed, all of which may be achieved without departing from the spirit and scope of the invention.

What is claimed is:

1. A power-transmitting system and control means therefor, comprising: a power shaft; a change-speed transmission including a driven shaft having a brake part rotatable therewith; dual-ratio planetary drive gearing for driving the driven shaft from the power shaft optionally at either of two speed ratios and including first and second brake devices normally simultaneously released to disconnect the planetary drive and alternately applicable to connect said drive in one or the other of said speed ratios; transmission brake means normally disengaged from and selectively engageable with the transmission driven shaft brake means; a rockshaft; first and second brake operators coaxially spaced apart and independently rockably carried on the rockshaft and connected respectively to the first and second brake devices; a third brake operator rockable on the rockshaft between the first and second operators and connected to the transmission brake means; said operators respectively having neutral positions from which they are individually rockable to respective active positions, each of said first and second operators being rockable in the same direction and exclusively of the third operator to apply their respective brake devices and the third operator being rockable in the opposite direction and exclusively of the first and second operators to apply the transmission brake means; each of said operators having a lever-receiving notch and said notches being alined lengthwise of the rockshaft when all of said operators are in their neutral positions; a support adjacent to the rockshaft; and a control lever carried by the support for movement in a neutral zone lengthwise of the rockshaft and through the operator notches to select any one operator exclusively of the others, and said lever being also movable selectively in opposite directions transverse to the rockshaft to move only a selected operator between its neutral and active positions.

2. A power-transmitting system and control means therefor, comprising: a power shaft; a change-speed transmission including a driven shaft having a brake part rotatable therewith; dual-ratio drive mechanism for driving the driven shaft from the power shaft optionally at either of two speed ratios and including first and second control devices normally simultaneously released to disconnect the drive mechanism in both speed ratios and alternately engageable to connect said drive mechanism in one or the other of said speed ratios; transmission brake means normally disengaged from and selectively engageable with the transmission driven shaft brake means; a rockshaft; first and second operators coaxially spaced apart and independently rockably carried on the rockshaft and connected respectively to the first and second control devices; a third operator rockable on the rockshaft between the first and second operators and connected to the transmission brake means; said operators respectively having neutral positions from which they are individually rockable to respective active positions, each of said first and second operators being rockable in the same direction and exclusively of the third operator to engage their respective devices and the third operator being rockable in the opposite direction and exclusively of the first and second operators to apply the transmission brake means; each of said operators having a lever-receiving notch and said notches being alined lengthwise of the rockshaft when all of said operators are in their neutral positions; a support adjacent to the rockshaft; and a control lever carried by the support for movement in a neutral zone lengthwise of the rockshaft and through the operator notches to select any one operator exclusively of the others, and said lever being also movable selectively in opposite directions transverse to the rockshaft to move only a selected operator between its neutral and active positions.

3. A power-transmitting system and control means therefor, comprising: a power shaft; a change-speed transmission including a driven shaft having a brake part rotatable therewith; dual-ratio drive mechanism for driving the driven shaft from the power shaft optionally at either of two speed ratios and including first and second control devices normally simultaneously released to disconnect the drive mechanism in both speed ratios and alternately engageable to connect said drive mechanism in one or the other of said speed ratios; transmission brake means normally disengaged from and selectively engageable with the transmission driven shaft brake means; first, second and third operators arranged closely together in side-by-side relation and independently movable back and forth along parallel paths between neutral and active positions, each operator having actuator-receiving means thereon and said actuator-receiving means being alined in a neutral zone transversely of the aforesaid paths when the operators are all in their neutral positions; a support; an actuator carried by the support for movement through the neutral zone and transversely of the paths of movement of the operators to select the actuator-receiving means of one operator to the exclusion of the others, said actuator being also movable back and forth in opposite directions normal to the neutral zone for moving the selected operator along its aforesaid path; first and second means individually operatively connecting the first and second operators respectively to the first and second control devices; and means operatively connecting the third operator individually to the transmission brake means.

4. In a tractor having a fore-and-aft body including a side wall, a power plant on the body and having a transverse shaft outwardly of the wall, and a change-speed transmission rearwardly of the power plant and having an input gear outwardly of the wall and at the same side as the shaft, the improvement residing in a dual-range planetary mechanism comprising: a first sun gear coaxially fixed to the shaft outwardly of the plane of the input gear; a second sun gear outwardly of the first sun gear; bearing means on the shaft inwardly of the first sun gear; a planet carrier journaled on the bearing means and including planet mounting portions outwardly overhanging the sun gears and a hub secured to and extending inwardly of said portions in concentric relation to said bearing means; a drive gear coaxially fixed to the hub in inwardly spaced relation to the planet mounting portions, leaving a portion of said hub as an inboard bearing and said drive gear meshing with the input gear; first and second planet pinion means journaled on the planet mounting portions and meshing respectively with the first and second sun gears; a first ring gear journaled on the inboard bearing and meshing with the first planet pinion means; a coaxial second ring gear meshing with the second planet pinion means; means journaling the second ring gear coaxially with the shaft; and first and second brake means respectively cooperative with the first and second ring gears.

5. The invention defined in claim 4, in which: the means journaling the second ring gear includes a coaxial hub portion on and extending outwardly from the second sun gear as an outboard bearing, and said second ring gear is journaled on said outboard bearing.

6. The invention defined in claim 4, in which: the bearing means journaling the carrier includes a pair of coaxially spaced anti-friction bearings, one substantially in radial register with the drive gear and the other substantially in radial register with the first ring gear.

7. The invention defined in claim 4, including: a belt pulley housing mounted outwardly of said wall and having a driven gear meshing with said drive gear.

8. The invention defined in claim 4, including a fore-and-aft cover housing secured to the body wall over and enclosing the planetary mechanism; and control means mounted on said cover housing independently of the body and connected to the first and second brake means.

9. The invention defined in claim 8, including: a power take-off housing mounted on the cover housing and including drive means driven from the drive gear.

References Cited in the file of this patent

UNITED STATES PATENTS

| | | |
|---|---|---|
| 1,514,601 | Brown | Nov. 11, 1924 |
| 1,884,821 | Osgood | Oct. 25, 1932 |
| 1,957,221 | McCray | May 1, 1934 |
| 2,242,193 | Lawler | May 13, 1941 |

FOREIGN PATENTS

| | | |
|---|---|---|
| 153,896 | Australia | Oct. 30, 1953 |
| (Corresponding U. S. 2,718,271, Sept. 20, 1955.) | | |
| 466,353 | Great Britain | May 24, 1937 |